US012495270B2

(12) United States Patent
Pang et al.

(10) Patent No.: US 12,495,270 B2
(45) Date of Patent: Dec. 9, 2025

(54) APPARATUS AND METHOD FOR PERSONALIZED BINAURAL AUDIO RENDERING

(71) Applicant: HUAWEI TECHNOLOGIES CO., LTD., Shenzhen (CN)

(72) Inventors: Liyun Pang, Munich (DE); Martin Pollow, Munich (DE); Lauren Ward, York (GB); Gavin Kearney, York (GB); Thomas McKenzie, York (GB); Calum Armstrong, York (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 18/354,401

(22) Filed: Jul. 18, 2023

(65) Prior Publication Data

US 2024/0007819 A1 Jan. 4, 2024

Related U.S. Application Data

(63) Continuation of application No. PCT/EP2021/050896, filed on Jan. 18, 2021.

(51) Int. Cl.
*H04S 7/00* (2006.01)
*H04R 5/033* (2006.01)

(52) U.S. Cl.
CPC ............. *H04S 7/304* (2013.01); *H04R 5/033* (2013.01); *H04S 2400/11* (2013.01); *H04S 2420/01* (2013.01)

(58) Field of Classification Search
None
See application file for complete search history.

(56) References Cited

U.S. PATENT DOCUMENTS 12,010,494 B1 * 6/2024 Satongar .................. H04R 5/04
2016/0373877 A1 12/2016 Laitinen
(Continued)

FOREIGN PATENT DOCUMENTS

CN 109618274 A 4/2019

OTHER PUBLICATIONS

Seeber et al., "Subjective Selection of Non-Individual Head-Related Transfer Functions," Proceedings of the 2003 International Conference on Auditory Display, pp. 259-262, Boston, MA, USA (Jul. 6-9, 2003).

(Continued)

*Primary Examiner* — Qin Zhu
(74) *Attorney, Agent, or Firm* — Leydig, Voit & Mayer, Ltd.

(57) ABSTRACT

An apparatus provides personalized binaural audio rendering of an input signal. The apparatus has a left ear transducer configured to generate a left ear audio signal and a right ear transducer configured to generate a right ear audio signal. Moreover, the apparatus has processing circuitry configured to determine, based on a current target direction of the input signal, an adjusted current target direction using a personalized adjustment function that describes a functional relationship between a plurality of reference target directions of a reference sound signal and a plurality of perceived reference target directions of the reference sound signal as perceived by a user. The processing circuitry is further configured to implement a target direction renderer configured to generate based on the input signal and the adjusted target direction a first driving signal for driving the left ear transducer and a second driving signal for driving the right ear transducer.

14 Claims, 8 Drawing Sheets

(56) References Cited

U.S. PATENT DOCUMENTS

| | | | | |
|---|---|---|---|---|
| 2017/0164085 | A1 * | 6/2017 | Romigh | H04S 7/303 |
| 2018/0091921 | A1 * | 3/2018 | Silva | G06T 17/20 |
| 2019/0246231 | A1 | 8/2019 | Wardle et al. | |
| 2020/0045491 | A1 * | 2/2020 | Robinson | H04S 3/008 |
| 2020/0245091 | A1 * | 7/2020 | Alon | H04R 3/12 |
| 2020/0245092 | A1 * | 7/2020 | Badhwar | H04L 67/10 |
| 2023/0413005 | A1 * | 12/2023 | Barreiro | H04S 7/303 |

OTHER PUBLICATIONS

Andreopoulou et al., "Subjective HRTF evaluations for obtaining global similarity metrics of assessors and assessees," Journal on Multimodal User Interfaces 10, DOI 10.1007/s12193-016-0214-y, pp. 259-271, OpenInterface Association (Mar. 12, 2016).

Torres-Gallegos et al., "Personalization of head-related transfer functions (HRTF) based on automatic photo-anthropometry and inference from a database," Applied Acoustics 97, http://dx.doi.org/10.1016/j.apacoust.2015.04.009, pp. 84-95, Elsevier Ltd. (Oct. 2015).

Lee et al., "Personalized HRTF Modeling Based on Deep Neural Network Using Anthropometric Measurements and Images of the Ear," Applied Sciences, https://doi.org/10.3390/app8112180, pp. 1-14, MDPI (Nov. 7, 2018).

* cited by examiner

APPARATUS AND METHOD FOR PERSONALIZED BINAURAL AUDIO RENDERING

CROSS-REFERENCE TO RELATED APPLICATIONS

This application is a continuation of International Application No. PCT/EP2021/050896, filed on Jan. 18, 2021, the disclosure of which is hereby incorporated by reference in its entirety.

FIELD

The present disclosure relates to audio processing and audio rendering in general. More specifically, the present disclosure relates to an apparatus and method for personalized binaural audio rendering.

BACKGROUND

Binaural rendering may be used for rendering three-dimensional (3D) audio over headphones based on spatial filters known as head-related transfer functions (HRTFs). These filters describe how a sound source at any given angle with respect to the head of a listener results in time, level, and spectral differences of the received signals at the ear canals of the listener. However, these spatial filters are unique to the individual listener because they depend on the anatomic details of the head and the ears of the listener. Generic HRTFs based on averaged head and ear shapes are typically used, but have drawbacks in terms of incorrect perception of location of rendered sound sources as well as tonality. Personalized HRTFs, i.e. HRTFs adapted to the individual listener, provide an improved audio experience, but are more difficult to obtain. They typically require an individual listener to sit still in an anechoic chamber with microphones in the ears of the listener, while loudspeakers at predetermined locations play measurement stimuli. Signal processing is then applied to generate the personalized HRTFs from the measured stimuli.

SUMMARY

Aspects of the present disclosure provide an improved apparatus and method for personalized binaural audio rendering.

Generally, embodiments disclosed herein make use of a personalization scheme which compensates for errors in the perceived position of sound sources when rendered using generic HRTFs. Embodiments disclosed herein allow altering the panning trajectories of sound objects at the rendering stage such that they are perceived at the correct position, since generic HRTFs are likely to introduce localization errors and distortions when the sound is presented to the listener over the transducers of, for instance, headphones.

More specifically, according to a first aspect, an apparatus for personalized binaural audio rendering of an input signal is provided. The binaural rendering apparatus comprises a left ear transducer (e.g. a loudspeaker) configured to generate a left ear audio signal and a right ear transducer (e.g. a loudspeaker) configured to generate a right ear audio signal.

Moreover, the binaural rendering apparatus comprises a processing circuitry configured to determine, based on a current target (i.e. intended direction) of the input signal, an adjusted current target (i.e. intended direction) using a personalized adjustment function. The personalized adjustment function describes (i.e. is a representation or approximation of) a functional relationship (i.e. a mapping) between a plurality of reference target directions of a reference sound or input signal and a corresponding plurality of perceived reference target directions of the reference sound or input signal as perceived by a user.

The processing circuitry of the binaural rendering apparatus is further configured to implement a target direction renderer (also referred to as destination renderer), wherein the target direction renderer is configured to generate, based on the input signal and the adjusted current target direction, a first driving signal for driving the left ear transducer and a second driving signal for driving the right ear transducer for personalized binaural audio rendering of the input signal.

Advantageously, the apparatus for personalized binaural audio rendering according to the first aspect provides an improved binaural audio experience based on a personalized adjustment function that can be obtained in a simple and efficient manner.

In a further possible implementation form of the first aspect, the target direction renderer is configured to select, based on the adjusted current target direction, from a plurality of generic head related transfer functions, HRTFs, a first left ear HRTF for generating the first driving signal and a second right ear HRTF for generating the second driving signal.

In a further possible implementation form of the first aspect, the processing circuitry of the binaural rendering apparatus is further configured to determine an interaural time difference, ITD, correction and to generate the first driving signal based on the first HRTF and the ITD correction and the second driving signal based on the second HRTF and the ITD correction.

In a further possible implementation form of the first aspect, the target direction renderer is configured to generate the first driving signal based on a convolution of the first HRTF with the input signal and to generate the second driving signal based on a convolution of the second HRTF with the input signal.

In a further possible implementation form of the first aspect, the binaural rendering apparatus further comprises a memory configured to store the plurality of generic HRTFs.

In a further possible implementation form of the first aspect, the target direction renderer is configured to generate, based on the input signal and the adjusted current target direction, the first driving signal for driving the left ear transducer and the second driving signal for driving the right ear transducer using a binaural based Ambisonics scheme or a binaural amplitude panning scheme.

In a further possible implementation form of the first aspect, the processing circuitry of the binaural rendering apparatus is configured to determine, based on the current target direction of the input signal, the adjusted current target direction using the personalized adjustment function by interpolating the adjusted current target direction using the plurality of perceived reference target directions.

In a further possible implementation form of the first aspect, the processing circuitry of the binaural rendering apparatus is further configured to generate the personalized adjustment function by detecting (i.e. measuring) for the plurality of reference target directions of the reference sound signal the plurality of perceived reference target directions of the reference sound signal as perceived by the user, e.g. based on input by the user. This generation (i.e. measurement) of the personalized adjustment function may be performed during a personalization phase of the binaural rendering apparatus prior to its application phase, i.e. prior to using the personalized adjustment function for mapping the current target direction of an input signal into an adjusted current target direction.

According to a second aspect, headphones are provided comprising a binaural rendering apparatus according to the first aspect.

According to a third aspect, a method for personalized binaural audio rendering of an input signal is provided. The binaural rendering method comprises the steps of:

- determining, based on a current target direction of the input signal, an adjusted current target direction using a personalized adjustment function, wherein the personalized adjustment function describe (i.e. is a representation or approximation of) a functional relationship (i.e. mapping) between a plurality of reference target directions of a reference sound or input signal and a corresponding plurality of perceived reference target directions of the reference sound or input signal as perceived by a user;
- generating, based on the input signal and the adjusted current target direction, a first driving signal for driving a left ear transducer and a second driving signal for driving a right ear transducer; and
- generating by the left ear transducer a left ear audio signal based on the first driving signal and by the right ear transducer a right ear audio signal based on the second driving signal.

Advantageously, the method for personalized binaural audio rendering according to the third aspect provides an improved binaural audio experience based on a personalized adjustment function that can be obtained in a simple and efficient manner.

In a further possible implementation form of the third aspect, the step of generating the first driving signal and the second driving signal comprises selecting, based on the adjusted current target direction, from a plurality of generic head related transfer functions, HRTFs, a first left ear HRTF for generating the first driving signal and a second right ear HRTF for generating the second driving signal.

In a further possible implementation form of the third aspect, the binaural rendering method further comprises determining an interaural time difference, ITD, correction and generating the first driving signal based on the first HRTF and the ITD correction and generating the second driving signal based on the second HRTF and the ITD correction.

In a further possible implementation form of the third aspect, the step of generating the first driving signal and the second driving signal comprises generating the first driving signal based on a convolution of the first HRTF with the input signal and the second driving signal based on a convolution of the second HRTF with the input signal.

In a further possible implementation form of the third aspect, the binaural rendering method further comprises a step of retrieving the plurality of generic HRTFs from a memory.

In a further possible implementation form of the third aspect, the step of generating the first driving signal and the second driving signal comprises generating, based on the input signal and the adjusted current target direction, the first driving signal for driving the left ear transducer and the second driving signal for driving the right ear transducer using a binaural based Ambisonics scheme or a binaural amplitude panning scheme.

In a further possible implementation form of the third aspect, the step of determining, based on the current target direction of the input signal, the adjusted current target direction using the personalized adjustment function comprises interpolating the adjusted current target direction using the plurality of perceived reference target directions.

In a further possible implementation form of the third aspect, the binaural rendering method further comprises a step of generating the personalized adjustment function by detecting, i.e. measuring for the plurality of reference target directions of the reference sound signal the plurality of perceived reference target directions of the reference sound signal as perceived by the user, e.g. based on input by the user.

The binaural rendering method according to the third aspect can be performed by the binaural rendering apparatus according to the first aspect. Thus, further features of the binaural rendering method according to the third aspect result directly from the functionality of the binaural rendering apparatus according to the first aspect as well as its different implementation forms and embodiments described above and below.

According to a fourth aspect, a computer program product is provided, comprising a non-transitory computer-readable storage medium for storing program code which causes a computer or a processor to perform the method according to the third aspect, when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which.

In the following, identical reference signs refer to identical or at least functionally equivalent features.

DETAILED DESCRIPTION

In the following description, reference is made to the accompanying figures, which form part of the disclosure, and which show, by way of illustration, exemplary aspects of embodiments of the present disclosure or exemplary aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
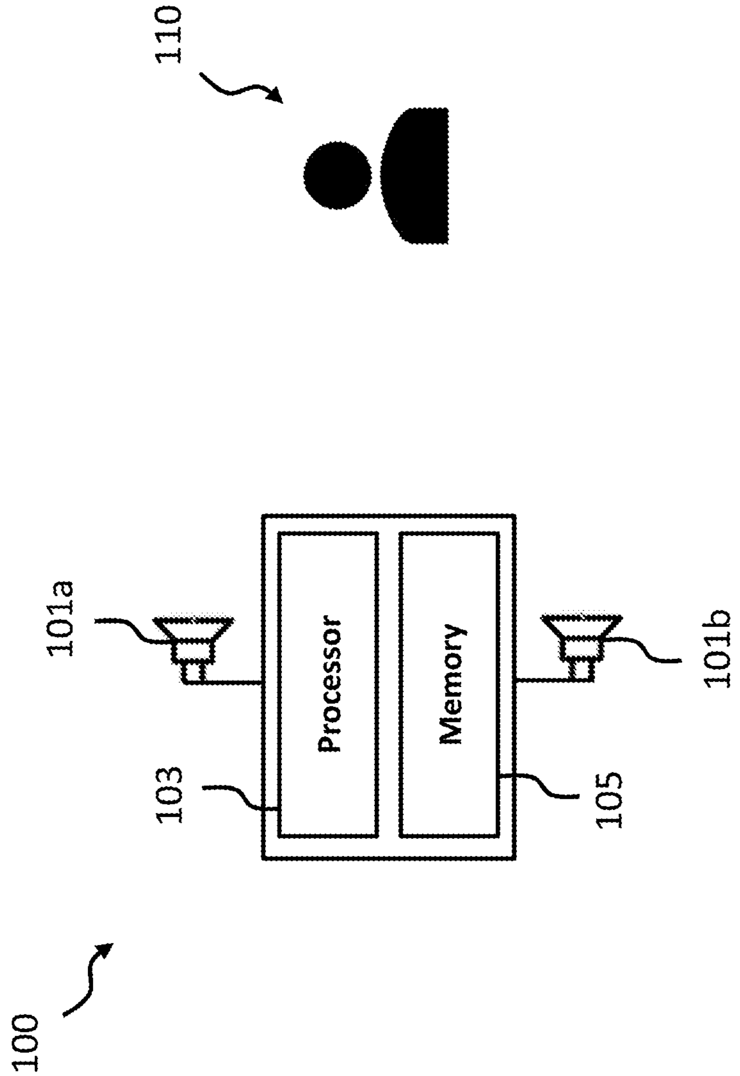
FIG. 1 is a schematic diagram illustrating a binaural audio rendering apparatus according to an embodiment.

FIG. 1 is a schematic diagram illustrating an apparatus 100 for personalized binaural audio rendering of an input signal. As illustrated in FIG. 1, the binaural audio rendering apparatus 100 comprises a left ear transducer, e.g. loudspeaker 101*a* configured to generate a left ear audio signal and a right ear transducer, e.g. loudspeaker 101*b* configured to generate a right ear audio signal for a user 110. In an embodiment, the binaural audio rendering apparatus 100 may be implemented in the form of headphones 100.

For controlling the left ear transducer 101*a* and the right ear transducer 101*b* the binaural audio rendering apparatus 100 further comprises a processing circuitry 103. The processing circuitry 103 may be implemented in hardware and/or software and may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The apparatus 100 may further comprise a memory 105 configured to store executable program code which, when executed by the processing circuitry 103, causes the binaural rendering apparatus 100 to perform the functions and methods described herein.

As will be described in more detail below, the processing circuitry 103 of the binaural audio rendering apparatus 100 is configured to determine, based on a current target (i.e. intended direction) of the input signal, an adjusted current target (i.e. intended direction) using a personalized adjustment function 103*a* implemented by the processing circuitry 103. The personalized adjustment function 103*a* describes (i.e. is a representation or approximation of) a functional relationship (i.e. a mapping) between a plurality of reference target directions of a reference sound or input signal and a corresponding plurality of perceived reference target directions of the reference sound or input signal as perceived by the user 110.

The processing circuitry 103 of the binaural rendering apparatus 100 illustrated in FIG. 1 is further configured to implement a target direction renderer 103*b* (also referred to as destination renderer and illustrated in FIGS. 6 and 7), wherein the target direction renderer 103*b* is configured to generate, based on the input signal and the adjusted current target direction, a first driving signal for driving the left ear transducer and a second driving signal for driving the right ear transducer for personalized binaural audio rendering of the input signal.

In an embodiment, the target direction renderer 103*b* may be configured to select, based on the adjusted current target direction, from a plurality of generic head related transfer functions, HRTFs, a first left ear HRTF for generating the first driving signal and a second right ear HRTF for generating the second driving signal. In an embodiment, the target direction renderer is configured to generate the first driving signal based on a convolution of the first left ear HRTF with the input signal and to generate the second driving signal based on a convolution of the second right ear HRTF with the input signal. The plurality of generic HRTFs, including the selected first left ear HRTF and the selected second right ear HRTF, may be stored in the memory 105 of the binaural rendering apparatus 100.

In an alternative embodiment, the target direction renderer 103*b* is configured to generate, based on the input signal and the adjusted current target direction, the first driving signal for driving the left ear transducer 101*a* and the second driving signal for driving the right ear transducer 101*b* using a binaural based Ambisonics scheme or a binaural amplitude panning scheme.

Figure 2:
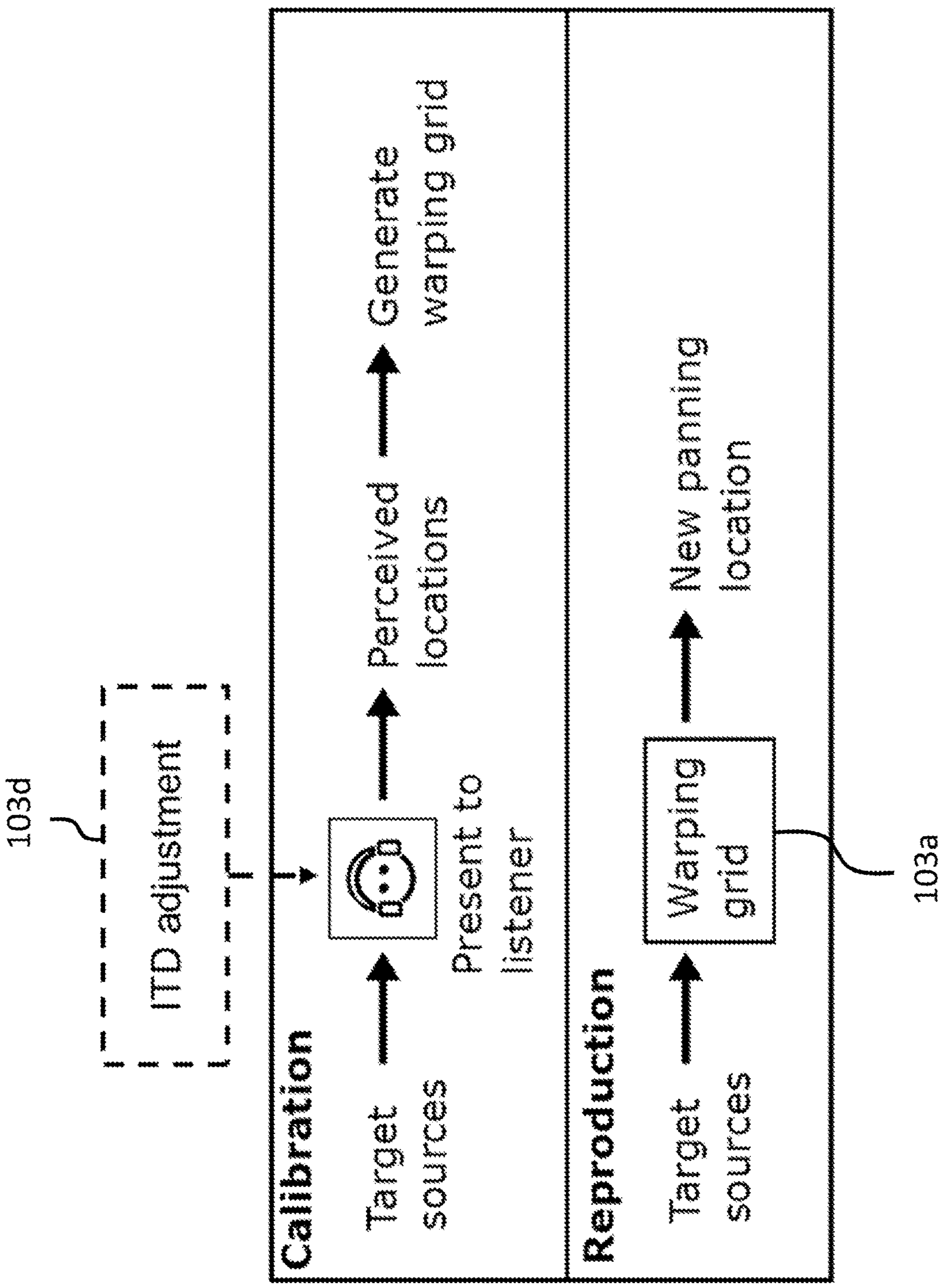
FIG. 2 is a schematic diagram illustrating processing steps implemented by a binaural rendering apparatus according to an embodiment during a calibration phase and during a reproduction phase.

FIG. 2 is a schematic diagram illustrating processing steps implemented by the binaural rendering apparatus 100 according to an embodiment during a calibration, i.e. personalization phase and during a reproduction phase of the binaural rendering apparatus 100. As will be appreciated from FIG. 2, the binaural rendering apparatus 100 provides a binaural reproduction of an audio signal based on user input calibration data, i.e. a perception-based calibration. In the calibration or personalization phase shown in FIG. 2 the binaural rendering apparatus 100 is configured to generate the personalized adjustment function 103*a* (referred to as warping grid 103*a* in FIG. 2) based on feedback from the user 110. In the reproduction or application phase, the binaural rendering apparatus 100 is configured to correct the sound source perception by the user 110 based on the personalized adjustment function, e.g. the warping grid 103*a*. As illustrated in FIG. 2, in an embodiment, the processing circuitry 103 of the binaural rendering apparatus 100 may be configured to determine an interaural time difference, ITD, correction for generating the personalized adjustment function (e.g. the warping grid 103*a*) in the calibration phase. Thus, in the reproduction phase, the processing circuitry 103 of the binaural rendering apparatus 100 is configured to generate the first driving signal based on the first left ear HRTF and the ITD correction and the second driving signal based on the second right ear HRTF and the ITD correction.

Figure 3B:
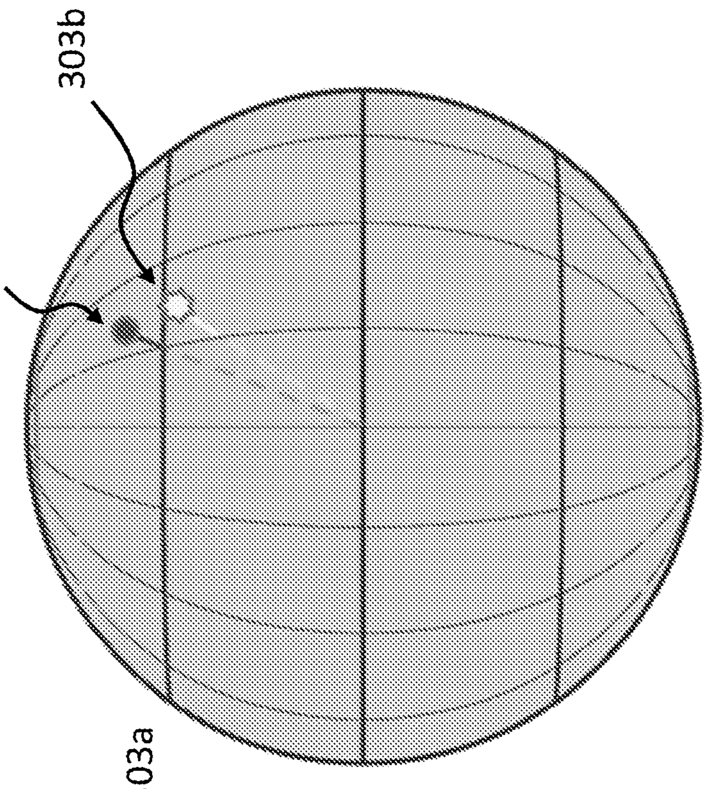
FIGS. 3*a* and 3*b* illustrate the effect of an adjustment of a target direction of an audio signal on the perceived direction of the audio signal provided by a binaural rendering apparatus according to an embodiment.
Figure 3A:
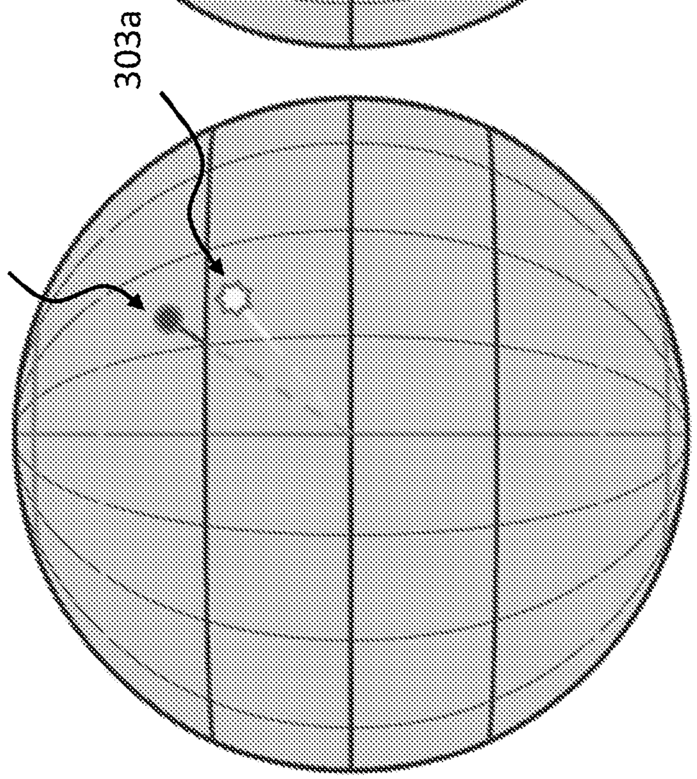

FIGS. 3*a* and 3*b* illustrate the effect of the adjustment of the current target direction 301*a* of an audio signal to the adjusted current target direction 301*b* on the perceived direction of the audio signal as provided by the binaural rendering apparatus 100 according to an embodiment in the reproduction phase. In FIG. 3*a*, a sound object has an exemplary intended source position (i.e. a current target direction 301*a*) of 0 degrees in azimuth and 45 degrees in elevation. By way of example, for a particular listener (i.e. the user 110) the sound object may be perceived at a perceived direction 303*a* of 0 degrees in azimuth and 30 degrees in elevation. As illustrated in FIG. 3*b*, the personalized adjustment function (e.g. the warping grid 103*a*) implemented by the processing circuitry 103 of the binaural rendering apparatus 100 may pan (i.e. map) the sound object from the current target direction 301*a* to the adjusted current target direction at 60 degrees in elevation, so that the perceived direction 303*b* is at 45 in elevation, as intended.

The calibration (i.e. personalization phase) of the binaural rendering apparatus 100 illustrated in FIG. 2 may comprise two main phases. In a first phase, as already described, above, the processing circuitry 103 of the binaural rendering apparatus 100 may be configured to implement an ITD adjustment module 103*d* for taking into account the specifics of the head radius of the user 110 by determining the ITD correction. In an embodiment, the ITD adjustment module 103*d* is configured to estimate the cross head delay of the user 110 and to take into account the displacement of the ear drum inside the head. In an embodiment, the ITD adjustment module 103*d* and the transducers 101*a*, 101*b* are configured to generate 6 500 ms noise bursts, wherein the interaural delay of each alternate pulse is shifted until an azimuthal shift in the position of the stimulus is just perceptible by the user 110. This threshold represents the maximum perceivable cross head delay of the user 110.

More specifically, in an embodiment, the ITD adjustment module 103*d* may be configured to implement the following steps for estimating the ITD correction. Stimuli are presented to the user 110 with all noise bursts exhibiting a uniform 1 ms interaural delay. These noise bursts will all be perceived as stationary on one side of the head of the user 110 due to the precedence effect. The user 110 is asked to increase the interaural delay value. While the interaural delay value is increased, the value of the interaural delay in alternate noise bursts is decreased in increments of 5 microseconds. The user 110 continues increasing the interaural delay value, until the noise bursts are no longer perceived as stationary, but move between locations on one side of the head of the user 110. This may be initially done, by way of example, for the right ear of the user 110, and then subsequently between the left and the right ear of the user 110. The results thereof may be averaged to obtain a more accurate cross head delay. On the basis thereof, the ITD adjustment module 103*d* may use a spherical model is for computing the ITD correction value to be added to the first and second HRTF. This ensures that in the further processing stages not all sound sources are located at the side of the head of the user 110 due to a wrong interaural delay.

Figure 4:
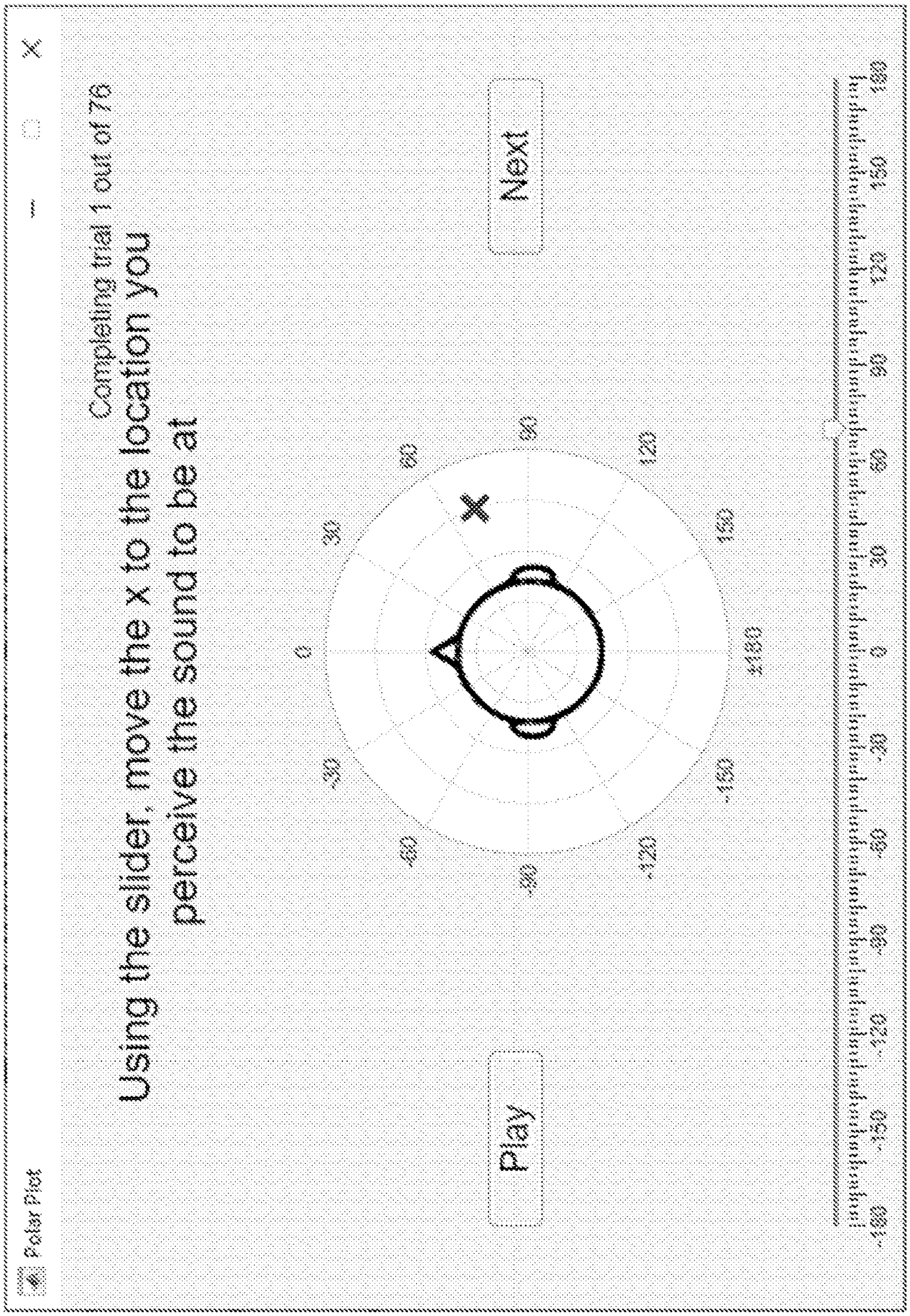
FIG. 4 illustrates a graphical user interface for personalizing a binaural rendering apparatus according to an embodiment.
Figure 5:
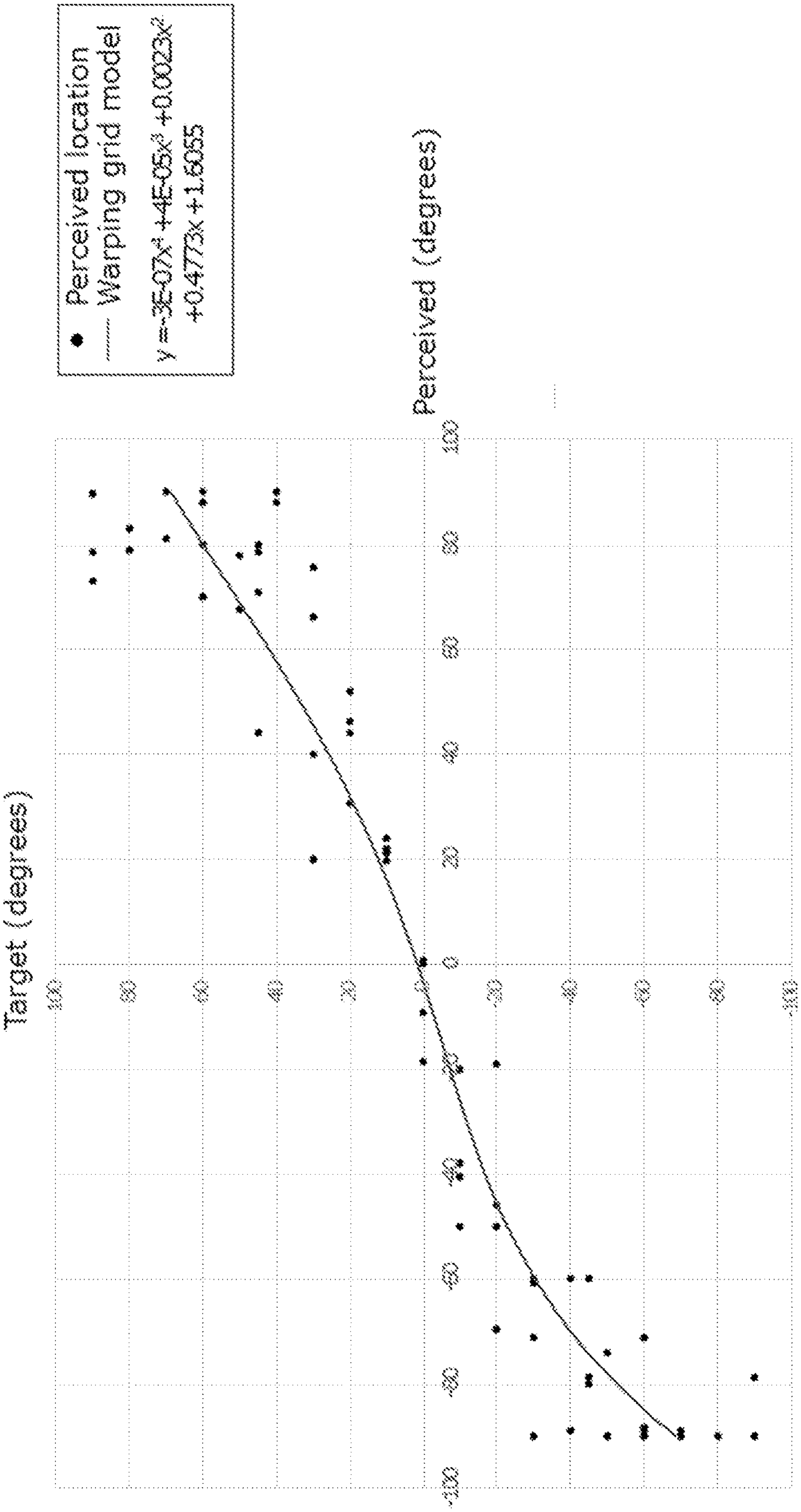
FIG. 5 illustrates an exemplary personalized adjustment function used by a binaural rendering apparatus according to an embodiment for mapping a target direction of an audio signal into an adjusted target direction.

In the second main phase of the calibration (i.e. personalization phase of the binaural rendering apparatus 100), the processing circuitry 103 is configured to generate the personalized adjustment function (i.e. warping grid 103*a*) by measuring for a plurality of reference target directions of a reference sound signal a plurality of perceived reference target directions of the reference sound signal as perceived by the user 110. By way of example, the processing circuitry 103 may be configured to measure the perceived locations of 76 sources from the user. These 76 sources may define a fine sampling grid, e.g. defined by reference sources located at [+/−90, +/−80, +/−70, +/−60, +/−50, +/−45, +/−40, +/−30, +/−20, +/−10, 0] as well as a coarse sampling grid comprising reference sources located at [+/−90, +/−60, +/−45, +/−+/−20, +/−10, 0]. The measurements for these locations may be performed more than once. In an embodiment, the user's perceived location may be obtained gathered using the graphical user interface illustrated in FIG. 4, which allows the user 110 to indicate the perceived angular location, i.e. direction, using a polar plot. Any front/back reversals may be identified by noting responses which are outside the +/−90 range of the target sources. These sources may then be projected to their corresponding location in front of the user 110. These points, and the corrected perceived locations of the sources inputted by the user 110 may then be taken and fitted to an interpolation grid, i.e. the warping grid 103*a*. In case the measurements are performed for azimuth directions only, this could be for example a fourth order polynomial as illustrated in FIG. 5. In the example shown in FIG. 5, a fourth order polynomial provides a good fit in particular for the larger dispersion of the perceived reference target directions occurring at large angles, i.e. in the vicinity of +/−90. The polynomial, i.e. the personalized adjustment function 103*a* can then be used to predict the required rendered source location to achieve a particular perceived source location, as already described above.

As described above, the personalized adjustment function 103*a*, i.e. the warping grid 103*a* may be defined for a plurality of discrete reference directions in 1D (azimuth only) or in 2D (azimuth and elevation). For handling a current target direction different from one of these discrete reference directions the processing circuitry 103 of the binaural rendering apparatus 100 may be configured to determine, based on the current target direction 301*a* of the input signal, the adjusted current target direction 301*b* using the personalized adjustment function 103*a* by interpolating the adjusted current target direction 301*b* using one or more of the plurality of discrete perceived reference target directions.

Figure 6:
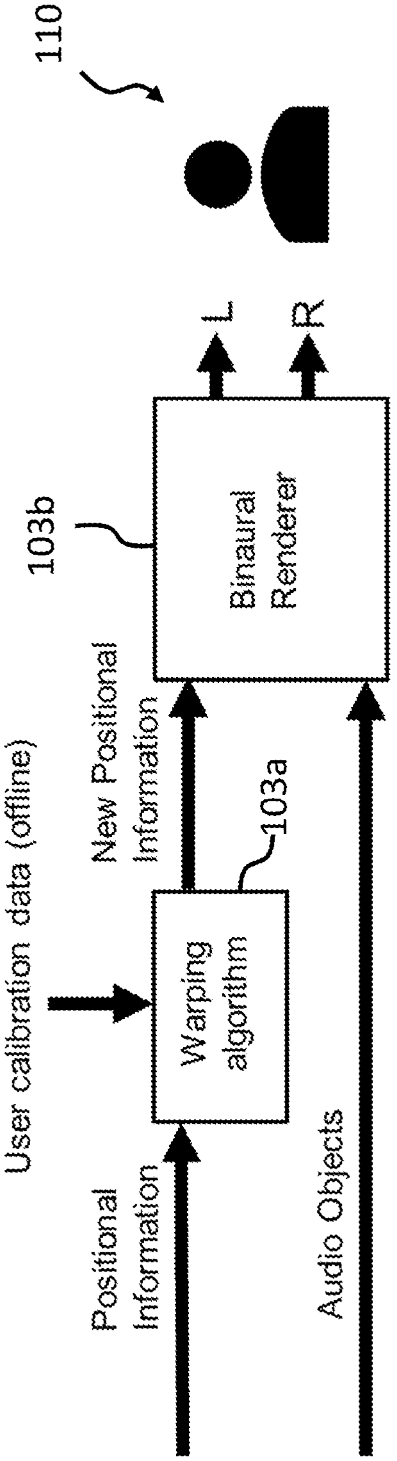
FIG. 6 is a schematic diagram illustrating processing blocks implemented by a binaural rendering apparatus according to an embodiment.

FIG. 6 is a schematic diagram illustrating processing blocks implemented by the binaural rendering apparatus 100 according to an embodiment (some of which already have been described above). The warping algorithm 103*a*, i.e. the personalized adjustment function 103*a* (generated on the basis of the user calibration data) is configured to map the current target direction (i.e. the positional information) into the adjusted current target direction (i.e. the new positional information). Based on the adjusted current target direction and the input signal (i.e. the audio objects) the target direction renderer 103*b* is configured to generate the driving signal L for driving the left ear transducer 101*a* and the second driving signal R for driving the right ear transducer 101*b*, for instance, by convolving the input signal with a first left ear HRTF and a second right ear HRTF.

Figure 7:
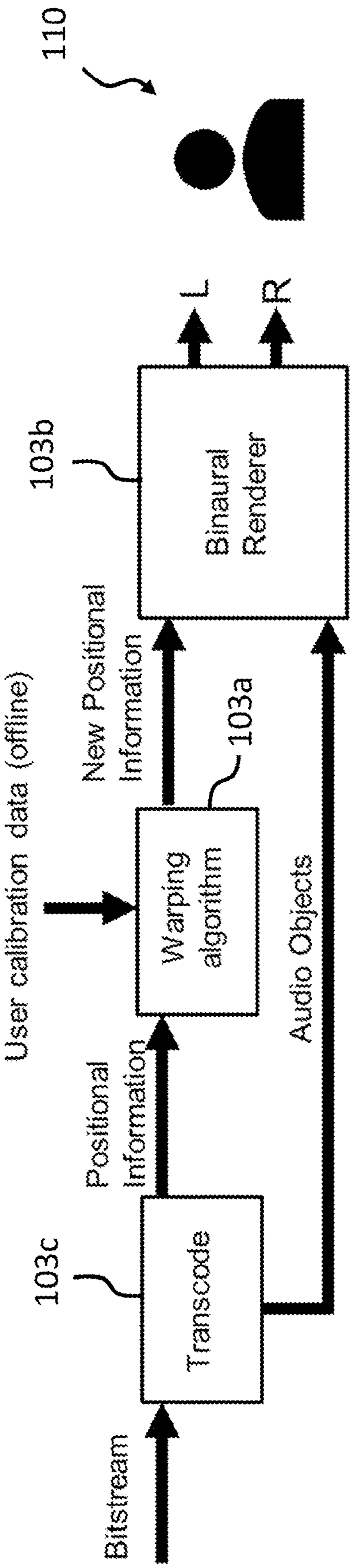
FIG. 7 is a schematic diagram illustrating processing blocks implemented by a binaural rendering apparatus according to a further embodiment.

In the embodiment shown in FIG. 7, the processing circuitry 103 of the binaural rendering apparatus 100 may further implement a transcoder 103*c* configured to extract the current target direction (i.e. the positional information) and the input signal (i.e. the audio objects) from a bitstream.

Figure 8:
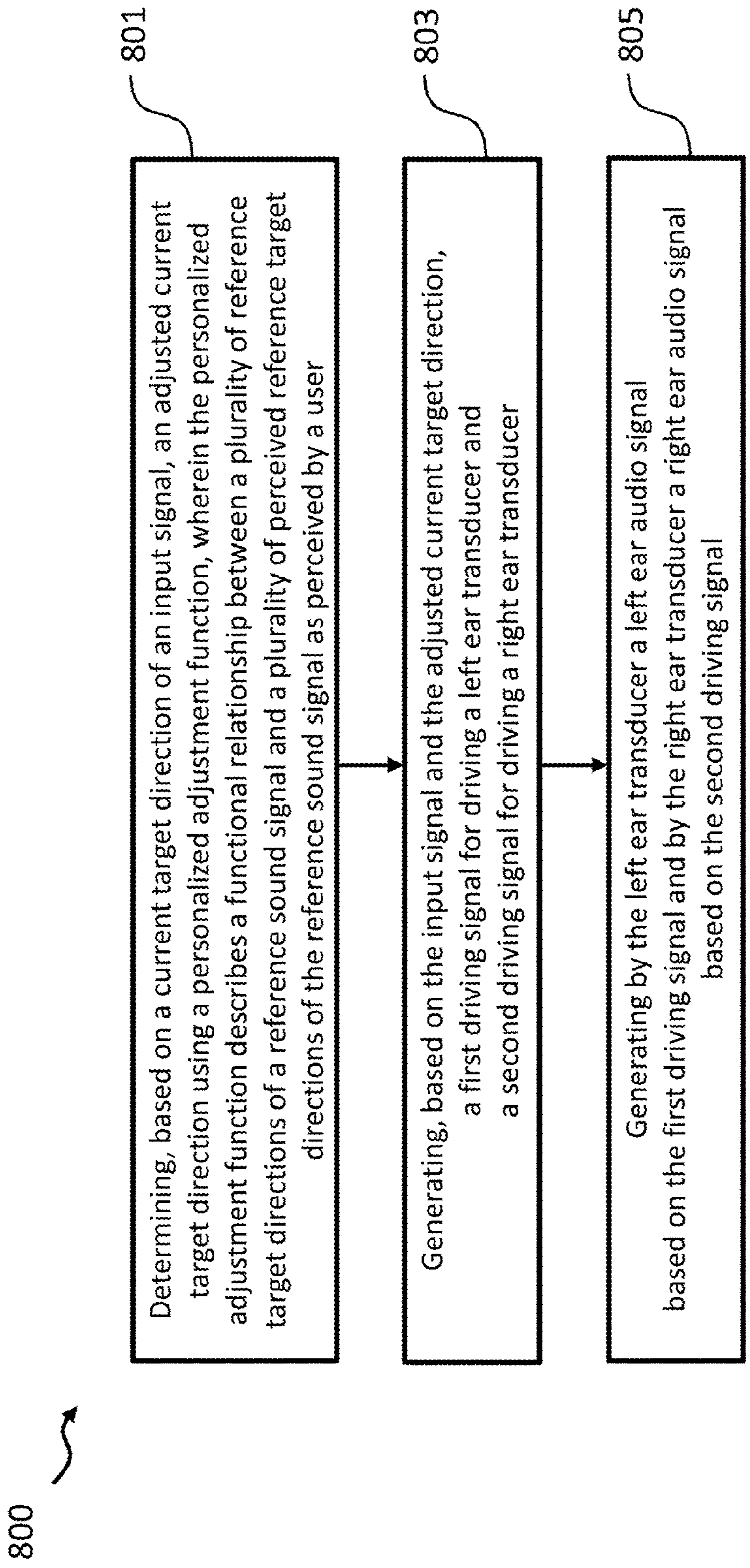
FIG. 8 is a flow diagram illustrating a binaural rendering method according to an embodiment.

FIG. 8 is a flow diagram illustrating a method 800 for personalized binaural audio rendering of an input signal. The method 800 comprises a first step of determining 801, based on the current target, i.e. intended direction 301*a* of the input signal, the adjusted current target direction 301*b* using the personalized adjustment function 103*a*. As already described above, the personalized adjustment function 103*a* describes a functional relationship between a plurality of reference target directions of a reference sound or input signal and a plurality of perceived reference target directions of the reference sound or input signal as perceived by the user 110.

Moreover, the personalized binaural audio rendering method 800 comprises a step of generating 803, based on the input signal and the adjusted current target direction 301*b*, a first driving signal for driving the left ear transducer 101*a* and a second driving signal for driving the right ear transducer 101*b*.

The personalized binaural audio rendering method 800 further comprises a step of generating 805 by the left ear transducer 101*a* a left ear audio signal based on the first driving signal and by the right ear transducer 101*b* a right ear audio signal based on the second driving signal.

The personalized binaural rendering method 800 can be performed by the binaural rendering apparatus 100 according to an embodiment. Thus, further features of the binaural rendering method 800 result directly from the functionality of the binaural rendering apparatus 100 as well as its different embodiments described above and below.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

What is claimed is:

1. An apparatus for personalized binaural audio rendering of an input signal, the apparatus comprising:

a left ear transducer configured to generate a left ear audio signal;

a right ear transducer configured to generate a right ear audio signal; and a processing circuitry configured to:

determine, based on a current target direction of the input signal, an adjusted current target direction using a personalized adjustment function, wherein the personalized adjustment function describes a functional relationship between a plurality of reference target directions of a reference sound signal and a plurality of perceived reference target directions of the reference sound signal as perceived by a user; and implement a target direction renderer, wherein the target direction renderer is configured to:

generate, based on the input signal and the adjusted current target direction, a first driving signal for driving the left ear transducer and a second driving signal for driving the right ear transducer; and select, based on the adjusted current target direction, from a plurality of generic head-related transfer functions (HRTFs), a first HRTF for generating the first driving signal and a second HRTF for generating the second driving signal, and wherein the processing circuitry is further configured to:

determine, in a first phase, an interaural time difference (ITD) correction;

generate the first driving signal based on the first HRTF and the ITD correction;

generate the second driving signal based on the second HRTF and the ITD correction, wherein the ITD correction is determined based on a generation of noise bursts, wherein an interaural delay of each alternative pulse is shifted until an azimuthal shift in the position of the stimulus is just perceptible by the user; and generate, in a second phase, the personalized adjustment function by measuring for the plurality of reference target directions of the reference sound signal the plurality of perceived reference target directions of the reference sound signal as perceived by the user.

2. The apparatus of claim 1, wherein the target direction renderer is configured to generate:

the first driving signal based on a convolution of the first HRTF with the input signal; and the second driving signal based on a convolution of the second HRTF with the input signal.

3. The apparatus of claim 1, wherein the apparatus further comprises a memory configured to store the plurality of generic HRTFs.

4. The apparatus of claim 1, wherein the target direction renderer is configured to generate, based on the input signal and the adjusted current target direction, the first driving signal for driving the left ear transducer and the second driving signal for driving the right ear transducer using a binaural based Ambisonics scheme or a binaural amplitude panning scheme.

5. The apparatus of claim 1, wherein the processing circuitry is configured to determine, based on the current target direction of the input signal, the adjusted current target direction using the personalized adjustment function by interpolating the adjusted current target direction using one or more of the plurality of perceived reference target directions.

6. The apparatus of claim 1, wherein the processing circuitry is further configured to generate the personalized adjustment function by detecting for the plurality of reference target directions of the reference sound signal the plurality of perceived reference target directions of the reference sound signal as perceived by the user.

7. A set of headphones comprising the apparatus according to claim 1.

8. A method for personalized binaural audio rendering of an input signal, the comprising:

determining, based on a current target direction of the input signal, an adjusted current target direction using a personalized adjustment function, wherein the personalized adjustment function describes a functional relationship between a plurality of reference target directions of a reference sound signal and a plurality of perceived reference target directions of the reference sound signal as perceived by a user;

generating, based on the input signal and the adjusted current target direction, a first driving signal for driving a left ear transducer and a second driving signal for driving a right ear transducer;

generating by the left ear transducer a left ear audio signal based on the first driving signal; and generating by the right ear transducer a right ear audio signal based on the second driving signal, wherein generating the first driving signal and the second driving signal comprises selecting, based on the adjusted current target direction, from a plurality of generic head related transfer-functions (HRTFs), a first HRTF for generating the first driving signal and a second HRTF for generating the second driving signal, wherein the method further comprises:

determining, in a first phase, an interaural time difference (ITD) correction;

generating the first driving signal based on the first HRTF and the ITD correction;

generating the second driving signal based on the second HRTF and the ITD correction, wherein the ITD correction is determined based on a generation of noise bursts, wherein an interaural delay of each alternative pulse is shifted until an azimuthal shift in the position of the stimulus is just perceptible by the user; and generating, in a second phase, the personalized adjustment function by measuring for the plurality of reference target directions of the reference sound signal the plurality of perceived reference target directions of the reference sound signal as perceived by the user.

9. The method of claim 8, wherein generating the first driving signal and the second driving signal comprises generating the first driving signal based on a convolution of the first HRTF with the input signal and the second driving signal based on a convolution of the second HRTF with the input signal.

10. The method of claim 8, wherein the method further comprises retrieving the plurality of generic HRTFs from a memory.

11. The method of claim 8, wherein generating the first driving signal and the second driving signal comprises generating, based on the input signal and the adjusted current target direction, the first driving signal for driving the left ear transducer and the second driving signal for driving the right ear transducer using a binaural based Ambisonics scheme or a binaural amplitude panning scheme.

12. The method of claim 8, wherein determining, based on the current target direction of the input signal, the adjusted current target direction using the personalized adjustment function comprises interpolating the adjusted current target direction using the plurality of perceived reference target directions.

13. The method of claim 8, wherein the method further comprises generating the personalized adjustment function by detecting for the plurality of reference target directions of the reference sound signal the plurality of perceived reference target directions of the reference sound signal as perceived by the user.

14. A non-transitory computer-readable storage medium storing program code which causes a computer or a processor to perform the method of claim 8, when the program code is executed by the computer or the processor.

* * * * *